(12) United States Patent
Wills

(10) Patent No.: US 7,293,681 B2
(45) Date of Patent: Nov. 13, 2007

(54) RACK SYSTEM TO CARRY JEEP DOORS WHILE TRAVELING

(75) Inventor: Robert Wills, Apo (AE)

(73) Assignee: Robert P. Wills, Sierra Vista, AZ (US)

( * ) Notice: Subject to any disclaimer, the term of this patent is extended or adjusted under 35 U.S.C. 154(b) by 531 days.

(21) Appl. No.: 10/891,135

(22) Filed: Jul. 15, 2004

(65) Prior Publication Data

US 2006/0011684 A1    Jan. 19, 2006

(51) Int. Cl.
*B60R 9/00*    (2006.01)
(52) U.S. Cl. ............... 224/497; 224/495; 224/502; 414/462
(58) Field of Classification Search ........... 224/497, 224/512, 488, 502, 504, 495
See application file for complete search history.

(56) References Cited

U.S. PATENT DOCUMENTS

| | | | | |
|---|---|---|---|---|
| 3,268,131 A | * | 8/1966 | Benton | 224/324 |
| 3,670,935 A | * | 6/1972 | Hinkston | 224/497 |
| 4,132,336 A | | 1/1979 | Leinaar | |
| 4,327,849 A | * | 5/1982 | Sharpton | 224/513 |
| 4,997,116 A | * | 3/1991 | Grim | 224/493 |
| 5,505,290 A | * | 4/1996 | Fujii et al. | 198/345.1 |
| 5,810,231 A | * | 9/1998 | Kravitz | 224/532 |
| 5,938,395 A | * | 8/1999 | Dumont, Jr. | 414/462 |
| 6,811,038 B1 | * | 11/2004 | Sanderson | 211/13.1 |
| 6,889,881 B2 | * | 5/2005 | Wilkens | 224/509 |
| 2005/0258200 A1 | * | 11/2005 | Scola | 224/42.13 |

FOREIGN PATENT DOCUMENTS

CA    2244143 A1 *  8/1998

* cited by examiner

*Primary Examiner*—Nathan J. Newhouse
*Assistant Examiner*—Margaret Olson

(57) ABSTRACT

A rack designed to provide convenient storage of doors optionally removable from "JEEP" style Sport Utility Vehicles. This allows a driver to operate the vehicle with the doors removed and thus free up interior space. The rack is mounted on the rear of the vehicle exteriorly of the rear-mounted spare tire. Mounted securely in the rack, the doors are spaced from the spare tire and are prevented from rubbing each other and the spare tire. The doors are therefore protected from scratches and abrasions.

3 Claims, 7 Drawing Sheets

RACK SYSTEM TO CARRY JEEP DOORS WHILE TRAVELING

BACKGROUND OF THE INVENTION

1. Field of the Invention

The present invention generally relates to auxiliary devices for automotive vehicles. More specifically, the present invention is drawn to a rack system or caddy for supporting the dismounted doors of automotive vehicles.

2. Description of the Related Art

Often, the drivers of certain types of Sport Utility Vehicles (SUV) desire to maximize the usable interior space of or just take a ride in an open vehicle. This scenario requires the removal of the doors of the particular vehicle. The SUV made by JEEP®, having body style CJ-7, is especially amenable to easy door removal. The "JEEP®" SUV has been popularized due to its use by the military and now finds use in many civilian applications.

Heretofore, removed doors were carried in the rear seat or secured by elastic cords to the rear spare tire of the vehicle. In the former instance, the concept of maximizing interior space is negated. The latter instance causes damage to the plastic door windows and warpage of the doors due to the uneven surface of the spare tire. Doors could be sometimes left behind, but this presented a problem if the doors were needed later to protect against severe weather conditions. A system for efficiently and safely mounting and transporting removable SUV doors on the rear of the vehicle would certainly be a welcome addition to the art.

U.S. Pat. No. 4,327,849 (Sharpton) and U.S. Pat. No. 4,132,336 (Leinaar) disclose support devices for the rear of "JEEP®" vehicles. The devices are designed to support auxiliary gasoline cans. There is no contemplation for efficiently and safely supporting removable doors.

None of the above inventions and patents, taken either singly or in combination, is seen to disclose a caddy for mounting removable SUV doors as will be subsequently described and claimed in the instant invention.

SUMMARY OF THE INVENTION

The instant invention is a rack system designed to provide convenient storage of doors optionally removable from "JEEP®" style Sport Utility Sport Utility Vehicles. This allows a driver to operate the vehicle with the doors removed and thus free up interior space. The rack system is mounted on the rear of the vehicle exteriorly of the rear-mounted spare tire. Mounted securely in the rack system, the doors are spaced from the spare tire and are prevented from rubbing each other and the spare tire. The doors are therefore protected from scratches and abrasions. The mounting arrangement does not adversely affect the driver's rear vision nor obstruct the view of the taillights and license plates. The aerodynamics of the moving vehicle remain stable.

A caddy of the rack system is easily removed from the rear of the vehicle and can be folded small enough to be stored within the vehicle when the doors are mounted on the vehicle. Unobtrusive brackets are attached to the vehicle's bumper, which brackets are utilized to support the caddy of the system thereon. An array of hinges and latches is employed to secure the doors to the caddy. Further, a nylon strap extends across the rear of the vehicle and functions as an additional security feature.

Accordingly, the invention presents a rack system having a caddy for "JEEP®" style vehicles, which caddy is employed to efficiently and safely secure doors dismounted from the vehicle. The caddy is designed for removable attachment to the rear of the vehicle directly behind the vehicle's spare tire. Fabricated from relatively lightweight tubing, the caddy may be folded for convenient storage when not in use.

The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
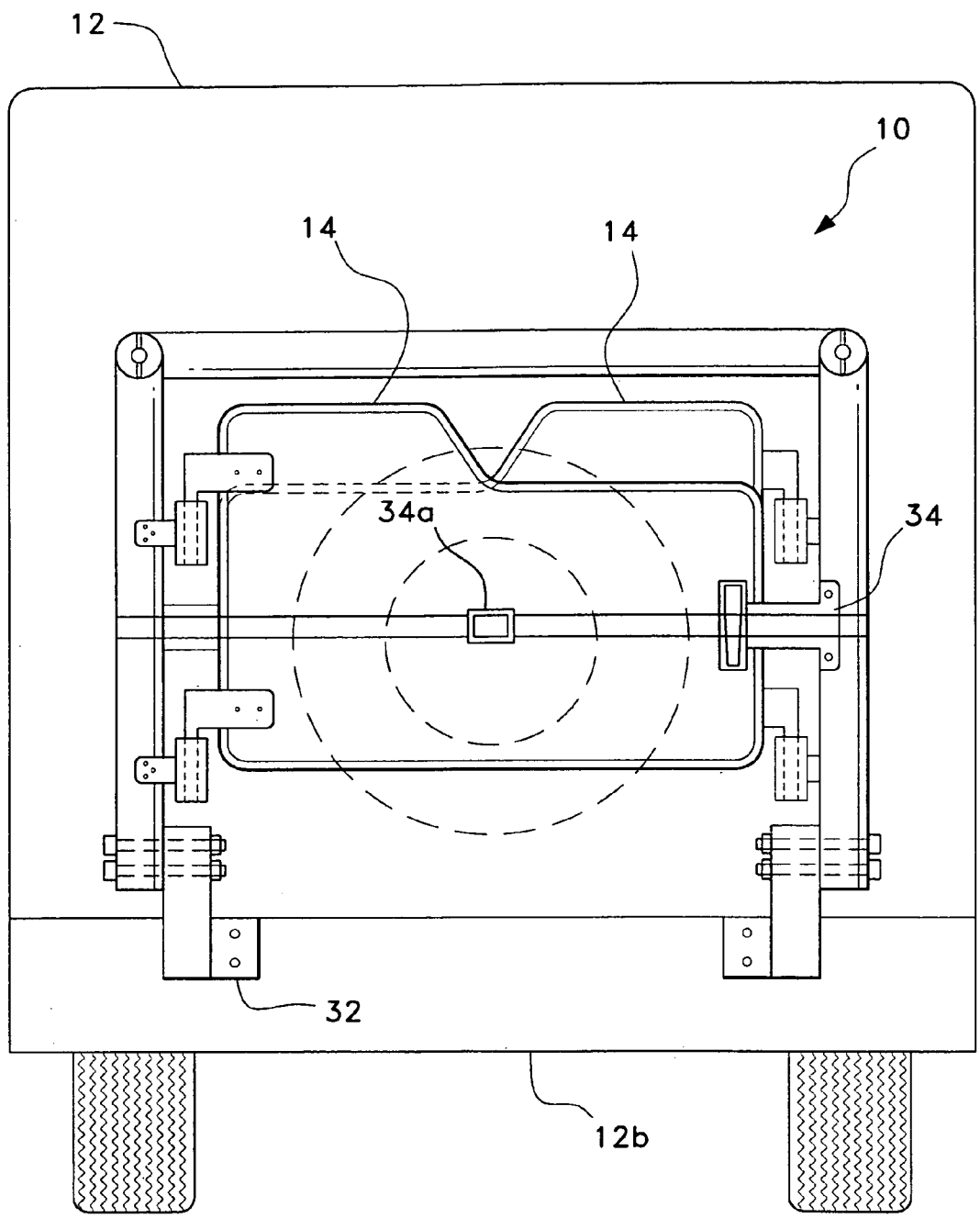
FIG. 1 is an environmental, perspective view of a caddy or rack system to carry vehicle doors according to the present invention.
Figure 2:
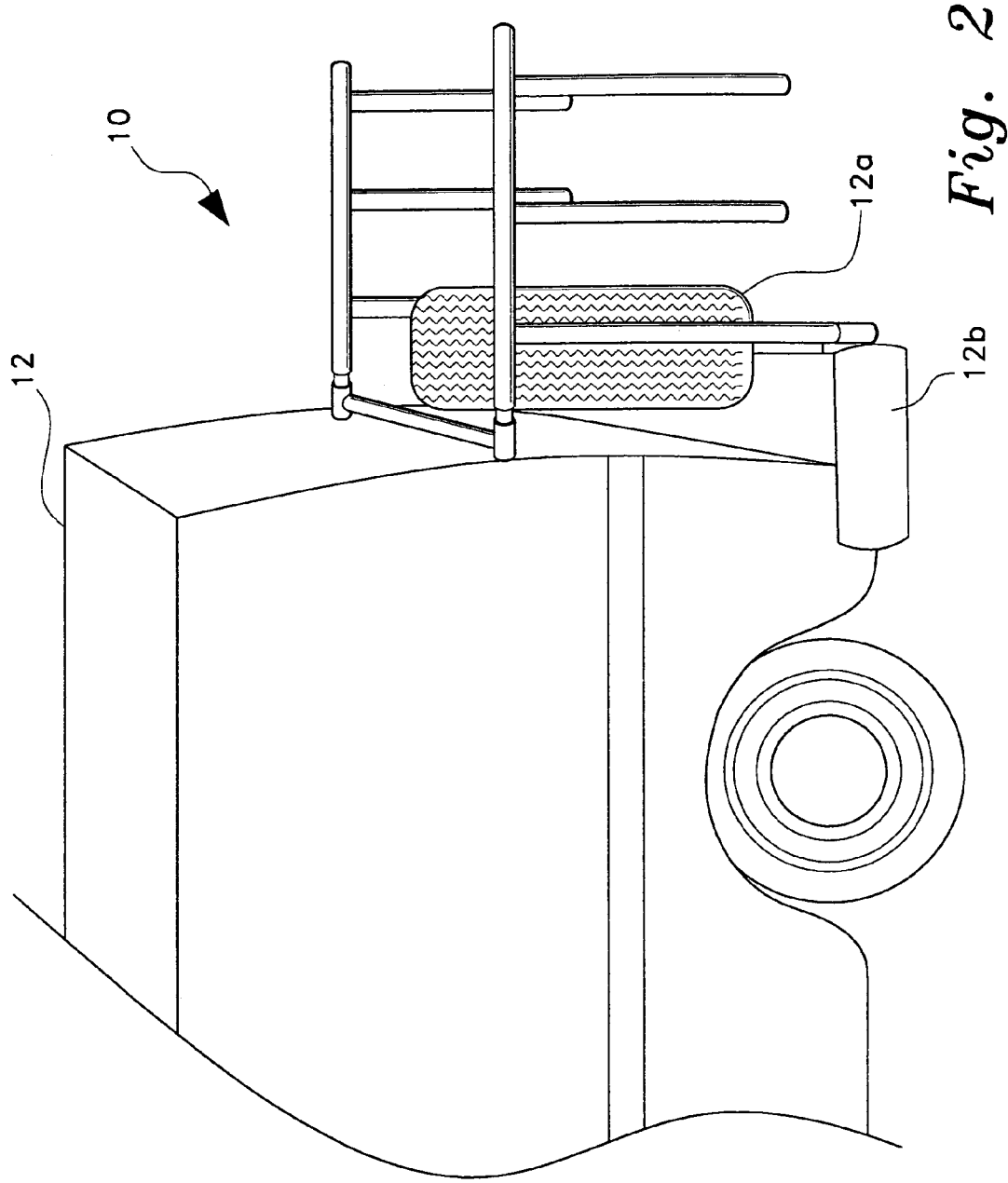
FIG. 2 is a environmental, perspective view of a caddy or rack system to carry vehicle doors according to the present invention.

Attention is first directed to FIGS. 1 and 2 wherein the caddy of the present invention is generally indicated at 10. Caddy 10 is mounted on the rear of SUV 12 adjacent rear-mounted spare tire 12a. SUV 12 is a vehicle having easily removable doors 14, which doors are secured to caddy 10 as will be further explained below.

Figure 3:
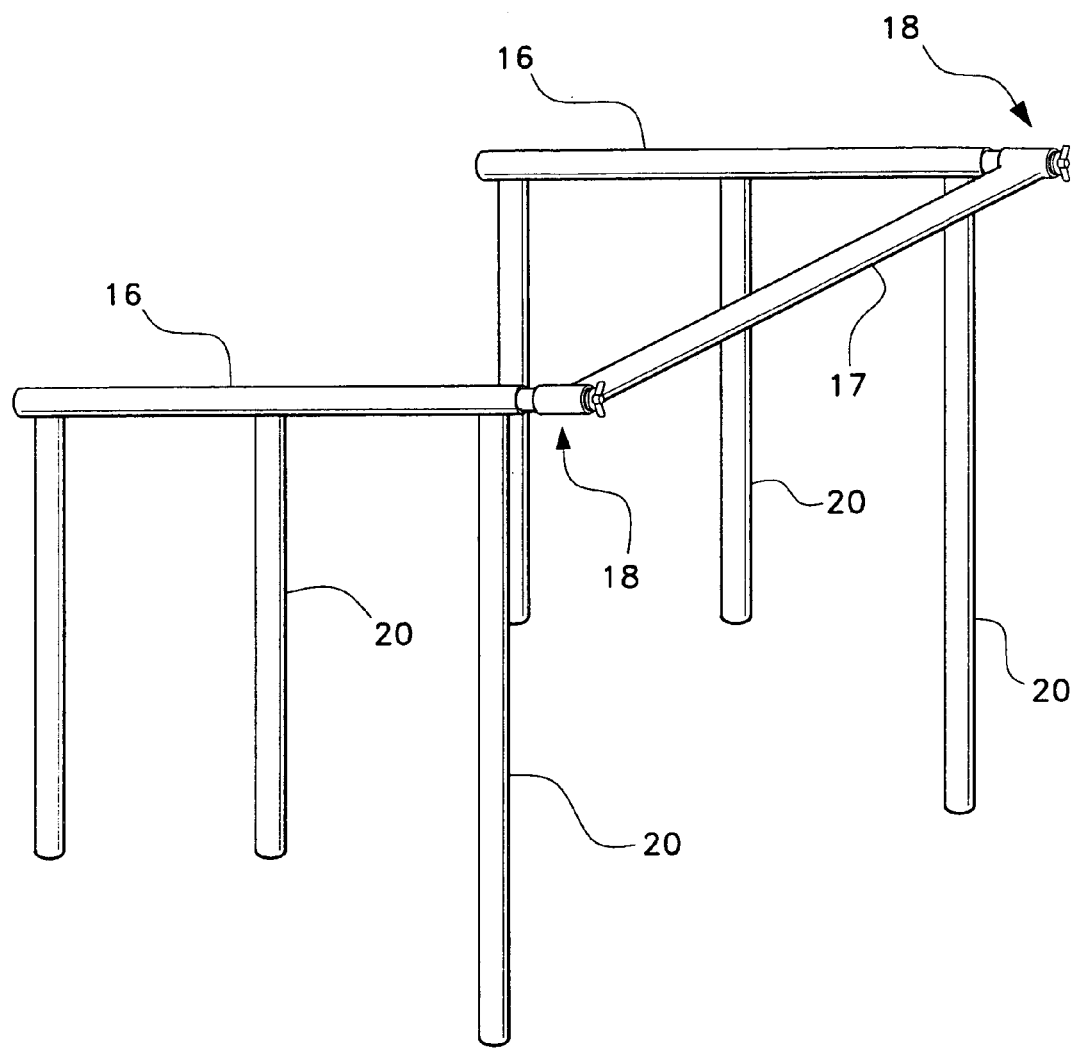
FIG. 3 is a perspective view of a caddy or rack in unfolded position according to the present invention.
Figure 4:
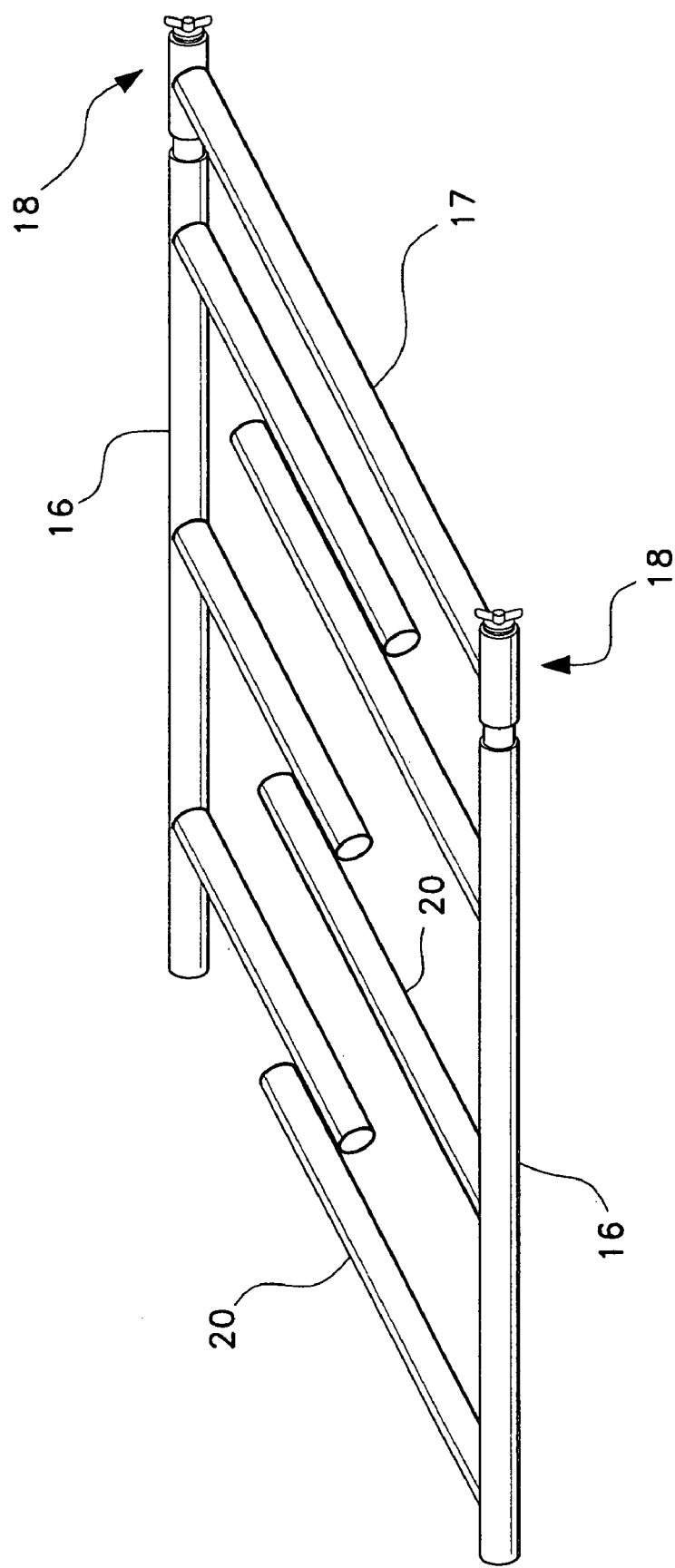
FIG. 4 is a perspective view of a caddy or rack in folded position according to the present invention.
Figure 5:
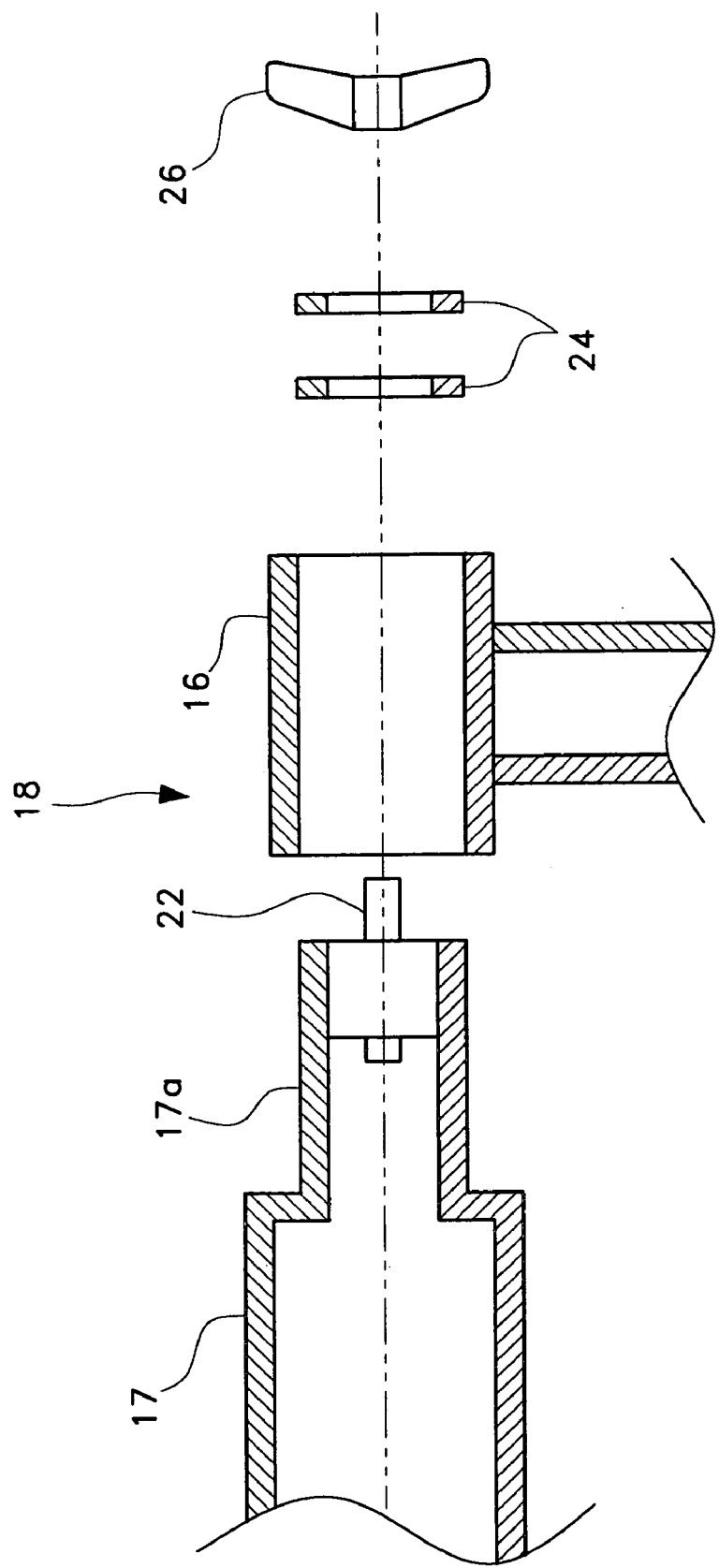
FIG. 5 is a partial view of a pivot assembly of a caddy or rack system according to the present invention.

As best seen in FIGS. 3 and 4, caddy 10 is fabricated from 1.5 inch metal tubing, which allows the caddy to have maximum strength while remaining lightweight. When unfolded (FIG. 3), the caddy is comprised of horizontally positioned tubes 16 and 17. Tubes 16 are rotatably mounted to tube 17 via friction hinge assemblies 18. Vertically oriented tubes 20 are attached to tubes 16 and extend perpendicular therefrom. Hinge assemblies 18 permit the tube to be folded for convenient storage when not in use (FIG. 4). Hinge assembly 18 is best shown in FIG. 5 and comprises step portions 17a (only one is shown) defining the ends of tube 17. Tubes 16 are rotatably mounted on portion 17a. Bolt 22, washers 24 and wing nut 26 are employed to tighten hinge 18 and prevent rotation when the caddy is unfolded.

Figure 6:
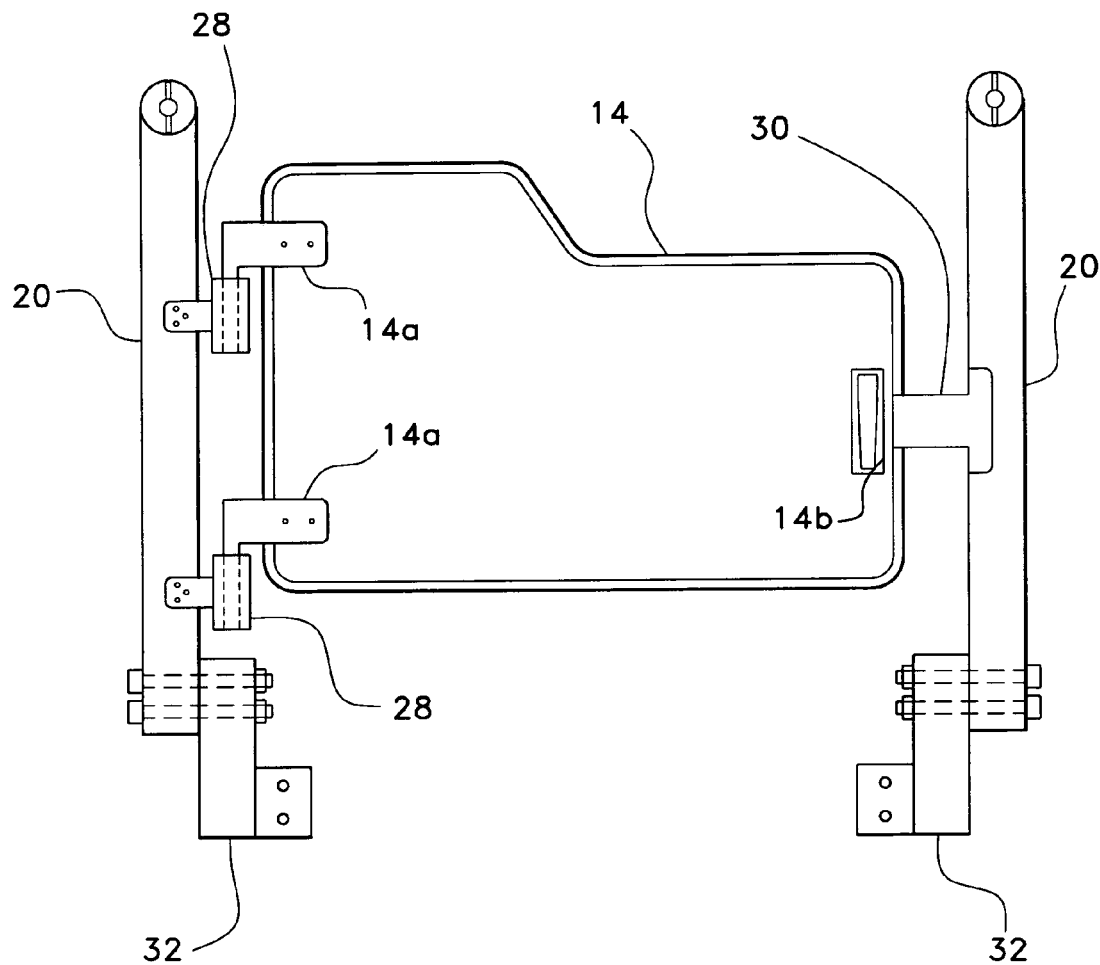
FIG. 6 is a partial view of a door mounted to a caddy or rack system according to the present invention.
Figure 7:
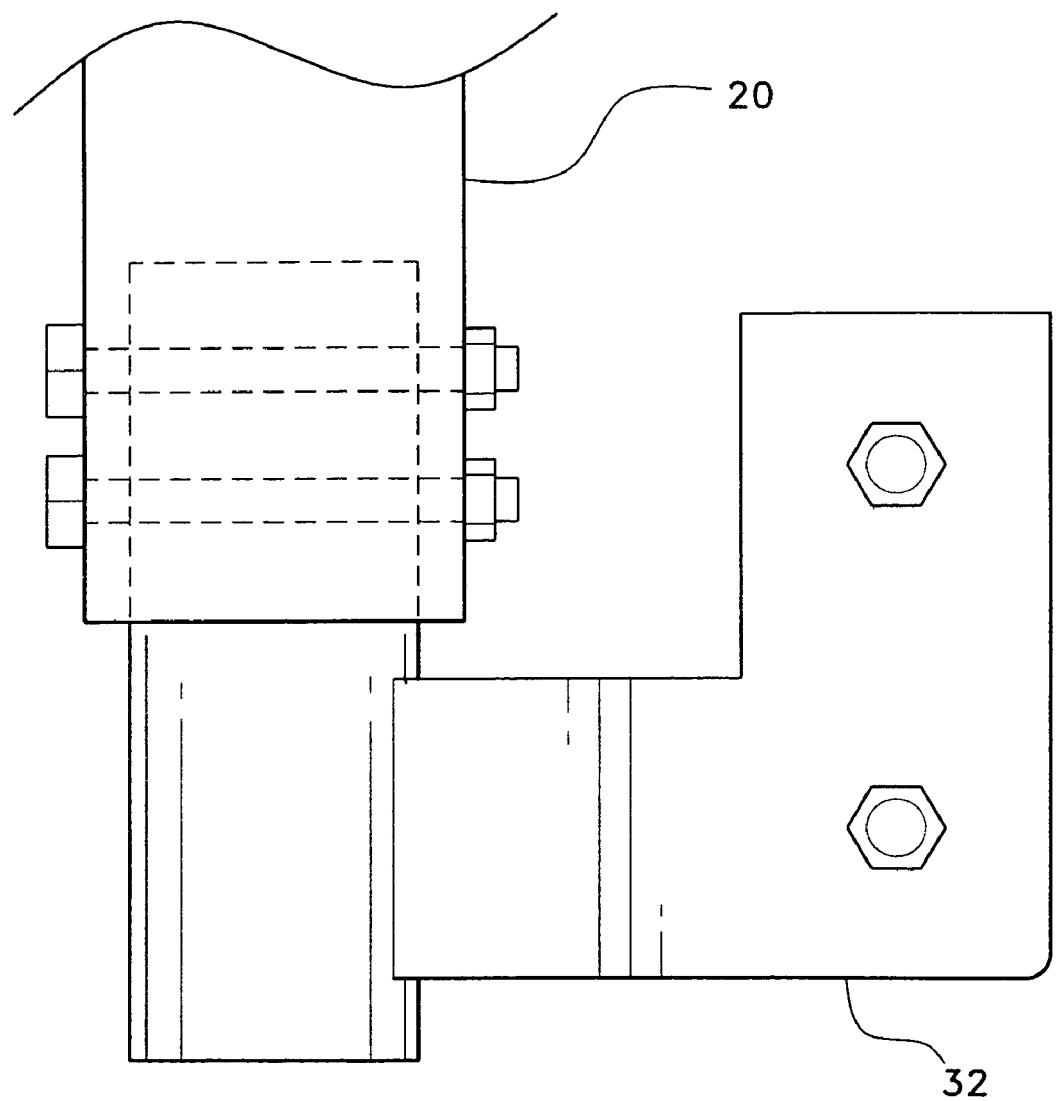
FIG. 7 is a partial view of a bracket for a caddy or rack system according to the present invention.

Turning now to FIGS. 6 and 7, conventional door hinge receivers 28 are attached and vertically spaced on selected ones of vertical tubes 20. Receivers 28 are positioned and spaced to accept door hinges 14a. Receivers 28 need not be attached to each tube but are positioned strategically on opposite sides of the caddy to accept the hinges of both dismounted doors. In like manner, conventional latch plates (only one is shown) 30 are attached to selected ones of vertical tubes 20. Latch plate 30 securely locks into latch receiver 14*b*. The rearmost vertical leg 20 is attached to the end of a bracket 32, which bracket is conventionally attached to the bumper 12*b* of the vehicle. The rear most leg 20 can be attached to the outside of the bracket 32 as shown in FIGS. 1 and 6 or it may be nested onto the bracket as shown in FIG. 7. Additional security is provided by means of a strap 34 (FIG. 1), which strap is fabricated from nylon webbing and riveted at its ends to the caddy. Strap 34 is provided with a quick release buckle 34*a*.

It is to be understood that the present invention is not limited to the embodiments described above, but encompasses any and all embodiments within the scope of the following claims.

I claim:

1. "A rack system for carrying a pair of removable vehicle doors each having hinge pins and a latch, said vehicle having a bumper and a rear-mounted spare tire, said rack system comprising:

a pair of brackets mounted to the bumper;

a foldable caddy mounted to said pair of brackets, said foldable caddy fabricated from tubular metal stock, wherein said foldable caddy includes:

first and second parallel, spaced tubular members;

a third tubular member disposed perpendicularly to said first and second tubular members, said third tubular member having first and second ends respectively connected to said first and second tubular members;

an array of tubular members attached to said first and second parallel, spaced tubular members, wherein said array of tubular members extend perpendicular to said first and second parallel, spaced tubular members;

structure attached to said caddy for securing said pair of removable doors thereon, wherein said structure includes a plurality of hinge receivers for accepting the door hinge pins and a pair of latch plates for accepting the door latches attached to selected ones of said array of tubular members so that the doors are supported between the hinge receivers and the latch plates."

2. The rack system according to claim 1, further including:

first and second rotatable hinge assemblies respectively disposed on opposite ends of said third tubular member, said hinge assemblies connecting said third tubular member to said respective first and second tubular members.

3. The rack system according to claim 1, wherein said structure attached to said caddy for securing said pair of removable doors thereon further includes a nylon strap attached to selected ones of said array of tubular members.

\* \* \* \* \*